No. 883,610. PATENTED MAR. 31, 1908.
D. S. BALLANCE.
COTTON CHOPPER.
APPLICATION FILED SEPT. 23, 1907.
2 SHEETS—SHEET 2.
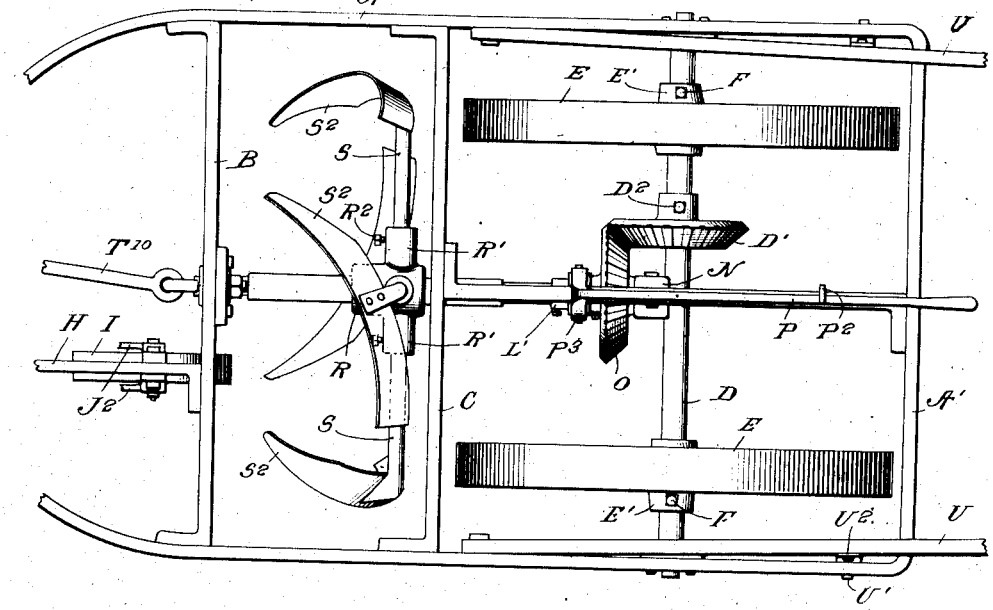
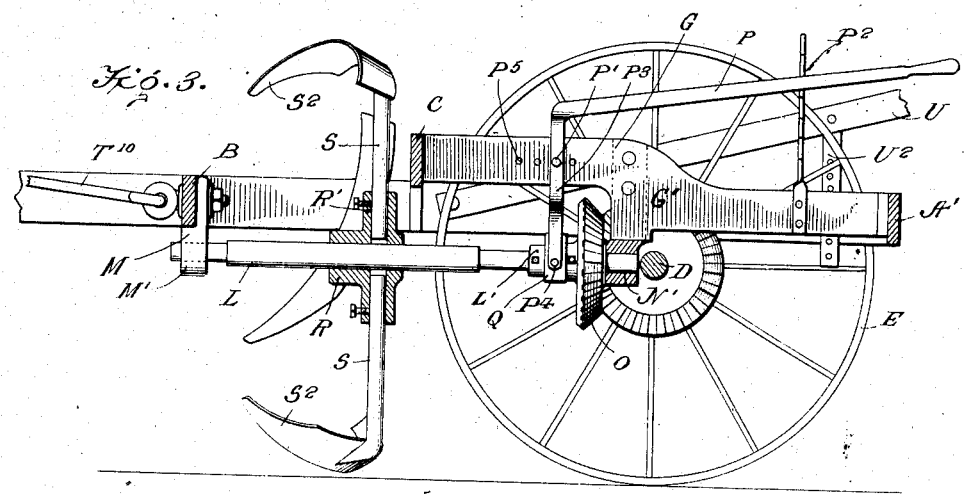
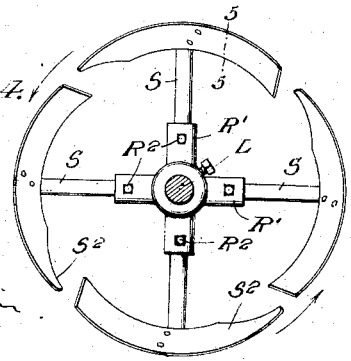
WITNESSES
J. H. Schmidt
Perry B. Turpin
INVENTOR
David S. Ballange,
BY Munn & Co.
ATTORNEYS

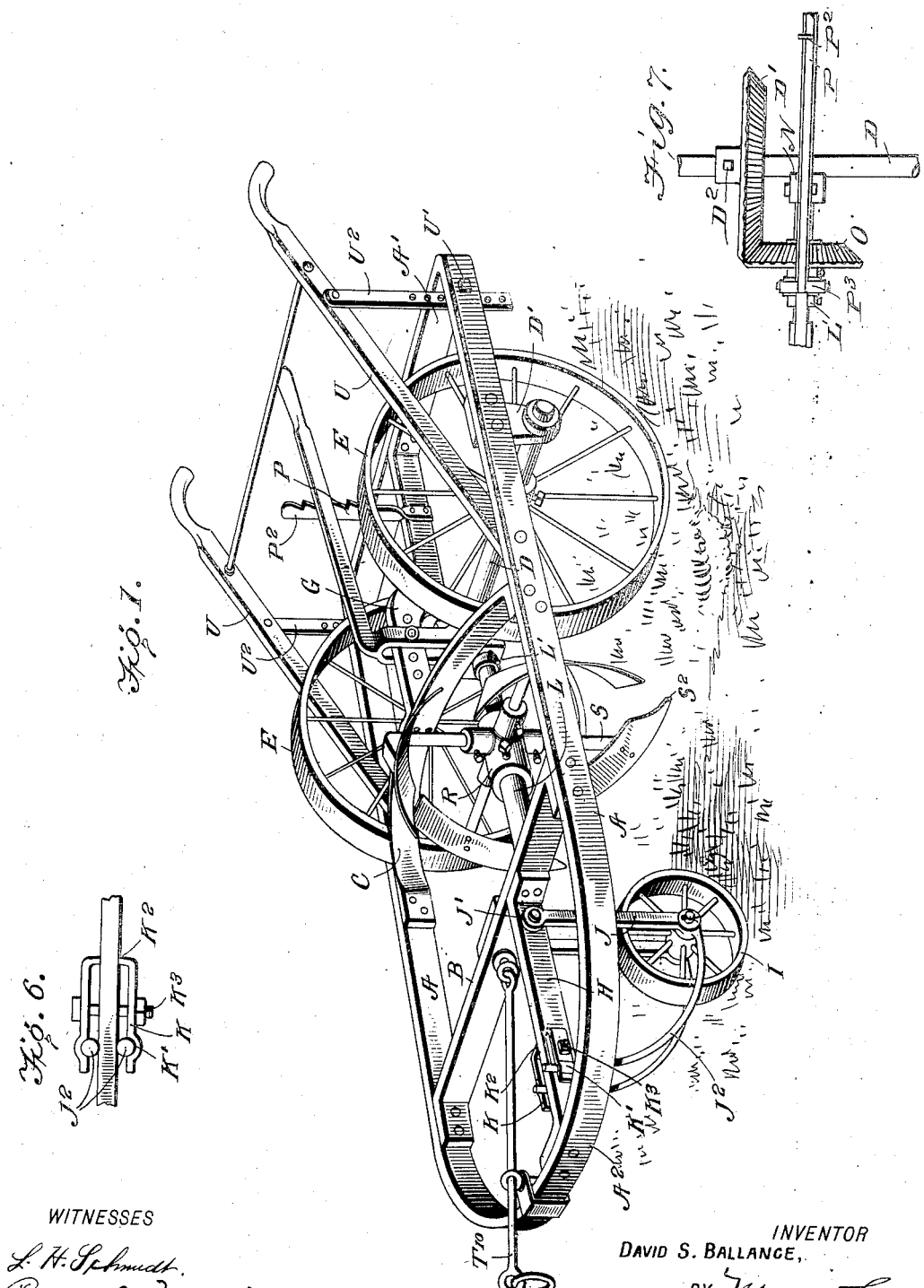

UNITED STATES PATENT OFFICE.

DAVID S. BALLANCE, OF WYSOCKING, NORTH CAROLINA, ASSIGNOR OF ONE-THIRD TO MARCUS A. BALLANCE, OF WYSOCKING, NORTH CAROLINA.

COTTON-CHOPPER.

No. 883,610.　　　Specification of Letters Patent.　　　Patented March 31, 1908.

Application filed September 23, 1907. Serial No. 394,126.

*To all whom it may concern:*

Be it known that I, DAVID S. BALLANCE, a citizen of the United States, and a resident of Wysocking, in the county of Hyde and State of North Carolina, have invented certain new and useful Improvements in Cotton-Choppers, of which the following is a specification.

This invention is an improvement in cotton choppers and consists in certain novel constructions and combinations of parts as will be hereinafter described and claimed.

In the drawings Figure 1 is a perspective view of a machine embodying my invention. Fig. 2 is a top plan view thereof, parts being broken away. Fig. 3 is a vertical longitudinal section of the machine, parts being broken away. Fig. 4 is a front view of the chopping wheel. Fig. 5 is a detail section on about line 5—5 of Fig. 4, and Fig. 6 is a detail top plan view illustrating the clamp for securing the front rods of the frame for the gage wheel, and Fig. 7 is a detail plan view showing gears of different size.

In carrying out the invention, I employ a frame having its outer bars formed preferably from a single bar of metal, welded, scarfed, or otherwise secured to form a complete unbroken frame having the side bars A, the back bar A' and the curved front bar $A^2$. The cross-bar B extends between the side bars A and an arch bar C also extends between said side bars in rear of the bar B and about midway between the said bar B and the axle D, which latter is journaled in bearings D' supported from the side bars A and has mounted upon it the wheels E secured to the axle D by clamp screws F passing through the hubs E' and engaging the axle and facilitating the adjustment of the wheels E along the axle to any desired position. The arch bar C has connected with it a longitudinal bar G, which extends to and is secured at its rear end to the rear cross-bar A', the bar G having a special construction between its ends as more fully described hereinafter. In securing the bars B, C and G, as well as the bar H which extends between the front curved bar $A^2$ and the cross-bar B, I prefer to provide flanges at the ends of the several bars B, C and G and H and bolt or rivet said flanges to the members with which the several bars connect, as will be understood from Figs. 1 and 2 of the drawings.

The gage wheel I is journaled in the frame having the rear upright bars J pivoted at their upper ends at J' to the framing, and the forwardly and upwardly projecting front bars $J^2$ whose upper ends extend along opposite sides of the frame bar H and are held thereto by the clamp plates K having seats K' for the bars $J^2$, bearing at one end $K^2$ against the frame bar and clamped together and toward the frame bar H by the bolt $K^3$, as best shown in Figs. 1 and 6 of the drawings. By this construction the bolt $K^2$ may be slacked and the bars $J^2$ be adjusted up or down to set the gage wheel higher or lower, as may be desired, and the said wheel may be secured in such adjustments by tightening the nut on the bolt $K^3$, as will be readily understood from Figs. 1 and 6 of the drawings.

The chopper wheel shaft L is journaled at its front end in a bearing M' formed in a bracket M secured to and depending from the cross-bar B and at its rear end the said shaft L is journaled in a bearing N' in a bracket N secured to and depending from the bar G, the latter having between its ends a depending portion G' to which the bracket N is secured, as will be understood from Figs. 2 and 3 of the drawings.

In journaling the shaft L, I provide its ends with tenons which are so formed, see Fig. 3, as to permit the longitudinal movement of the shaft L whereby the bevel gear O on the shaft L may be adjusted into and out of engagement with the bevel gear D' on the axle D. The bevel gear D' is secured upon the axle D by the screw $D^2$ so the said gear D' may be set along the axle to any desired position and the shaft L may be moved longitudinally from the position shown in Fig. 3 forwardly to move the gear O out of mesh with the gear D'. This is accomplished by means of the lever P, pivoted at P', and having its handle arm engaged with a rack $P^2$ to hold the gears O and D' in mesh, and the arm $P^3$ of the lever P is forked and connects at its lower end P⁴ with a shifter block Q which is held between the gear O and a collar L' adjustable on the shaft L so the movement of the lever in one direction or the other will force the shaft L back and forth longitudinally and thus move with it the gear wheel O, as well as the chopping wheel more fully described hereinafter.

In order to regulate the cut of the machine it is desirable in some instances to vary the turning of the shaft L relatively to the axle D and this may be accomplished by employing gears of different relative sizes as will be understood from Fig. 7 of the drawing. Thus, for instance, the gear O may be provided in sets of different sizes and applied to the shaft L. In such case it may be desirable to shift the pivot of the lever P and for this purpose I provide a series of pivot holes P⁵ in the bar G and also provide for shifting the gear wheel D' along the axle, as may be desired in the operation of the invention. By this construction, the wheel shaft L may be turned at any desired speed relatively to the axle and yet so arranged in respect to the wheel as to permit its adjustment for varying the cut and for thus regulating the stand of plants left in the row, as is desired in the use of machines of this class.

The chopping wheel comprises a hub R having a number of sockets R' corresponding to the spokes S which are adjustably secured in said sockets R' by screws R² so the said spokes may be turned in their sockets to any desired position and be held therein when once adjusted.

At their outer ends the spokes S are provided with forwardly inclined portions S', to the front faces of which are secured the hoes T which are thus arranged at an incline flaring outwardly toward their free edges at T', the spokes thus forming supports for and means for holding the hoes in position inclined, as before described. It will also be noticed that these hoes are pointed at their front ends at S², are curved from end to end in the arc of a circle, see Fig. 4, and preferably are set at an incline to the direction of motion of the machine, as best shown in Figs. 2 and 3 of the drawings. By this construction the hoes may be set to slightly overlap their ends so that the stand will only be that portion of the row left between the front end of any one hoe and the rear end of the next hoe in advance and this distance may be regulated by the rotary adjustment of the spokes in the sockets R', as before described.

It will be noticed that the outward or flaring inclination of the hoes, as best illustrated in Fig. 5, has a tendency to not only chop the plants from the row, but also to remove said plants and the soil in which they are bedded to one side of the row and thus secure a better chopping out of the row in the practical use of the invention.

Draft may be applied to the machine by means of a rod T¹⁰ arranged as best shown in Fig. 1 of the drawings, so the horse or mule may move alongside the row of plants.

The handles U are secured at their front ends to the side bars A and may be raised or lowered by means of the bolts U' operating in the perforations of the standards U², as will be understood from Figs. 1 and 3 of the drawings.

I claim—

1. The cotton chopper herein described comprising the framing having the outer side bars, the back bar and rounded front bar and provided with the intermediate cross-bars and with a longitudinal bar between the front cross-bar and the rounded front bar of the frame, the axle, the wheels, and gear wheel mounted on the axle, the wheel shaft, bearings in which said wheel shaft may be moved longitudinally and rotarily, a lever for moving the shaft, a gear wheel on the wheel shaft and movable therewith whereby it may be set into and out of mesh with the gear wheel on the axle, a frame bar forming pivotal support for the lever and having a series of holes for the pivot thereof whereby the lever may be adjusted along the frame bar and the chopping wheel having a hub on the wheel shaft and provided with sockets, the spokes journaled at their inner ends in said sockets and provided at their outer ends with forwardly projecting portions inclined on their under faces, means for securing the spokes in any desired adjustment in the sockets of the hub, and the hoes pointed at their front ends, curved from end to end approximately in the arc of a circle and held to the inclined faces of the outer end portions of the spokes whereby the hoes are inclined forwardly toward their outer edges, all substantially as set forth.

2. In a cotton chopper a chopping wheel, comprising a hub provided with sockets, spokes journaled at their inner ends in said sockets and provided at their outer ends with forwardly projecting portions inclined on their under faces, means for securing the spokes in any desired adjustment in their sockets, and hoes pointed at their front ends, curved from end to end approximately in the arc of a circle and held to the inclined faces of the outer end portions of the spokes whereby the hoes are inclined forwardly toward their outer edges, all substantially as set forth.

3. The combination in a cotton chopper of the frame, the axle, the gear wheel mounted on the axle, the chopper wheel, the shaft geared with said wheel, bearings in which said shaft may be moved longitudinally and rotarily, the lever for moving the shaft, the gear wheel on the wheel shaft and movable therewith whereby it may be set into and out of mesh with the gear wheel on the axle, and the frame bar forming a pivotal support for the lever and having a series of holes for the lever pivot whereby the lever may be adjusted along the frame bar, substantially as set forth.

DAVID S. $\overset{\text{his}}{\times}$ BALLANCE.
mark

Witnesses:
A. B. TUNNELL,
W. A. COBURN.